United States Patent
Rodrigues et al.

(10) Patent No.: US 11,541,348 B2
(45) Date of Patent: Jan. 3, 2023

(54) PROCESS AND APPARATUS FOR SEPARATING CARBON DIOXIDE FROM A WASTE GAS OF A FLUID BED CATALYTIC CRACKING (FCC) INSTALLATION

(71) Applicant: L'Air Liquide, Société Anonyme pour l'Etude et l'Exploitation des Procédés Georges Claude, Paris (FR)

(72) Inventors: Guillaume Rodrigues, La Queue en Brie (FR); Richard Dubettier-Grenier, La Varenne Saint Hilaire (FR)

(73) Assignee: L'Air Liquide, Société Anonyme our l'Étude et l'Exploitation des Procédés Georges Claude, Paris (FR)

( * ) Notice: Subject to any disclaimer, the term of this patent is extended or adjusted under 35 U.S.C. 154(b) by 66 days.

(21) Appl. No.: 17/126,267

(22) Filed: Dec. 18, 2020

(65) Prior Publication Data
US 2021/0187435 A1  Jun. 24, 2021

(30) Foreign Application Priority Data
Dec. 19, 2019  (FR) ...................................... 1914847

(51) Int. Cl.
*B01D 53/04* (2006.01)
*B01D 53/00* (2006.01)
(Continued)

(52) U.S. Cl.
CPC ....... *B01D 53/0476* (2013.01); *B01D 53/002* (2013.01); *C01B 32/50* (2017.08);
(Continued)

(58) Field of Classification Search
CPC .............. B01D 53/0476; B01D 53/002; B01D 2256/10; B01D 2257/504; C01B 32/50; C10G 11/18; C10G 2300/4043
See application file for complete search history.

(56) References Cited

U.S. PATENT DOCUMENTS

| | | | |
|---|---|---|---|
| 4,542,114 A | 9/1985 | Hegarty | |
| 5,565,089 A | 10/1996 | Ramachandran et al. | |

FOREIGN PATENT DOCUMENTS

| | | | | |
|---|---|---|---|---|
| EP | 1005895 A1 * | 6/2000 | ............. | B01D 53/04 |
| FR | 2 872 890 | 1/2006 | | |

(Continued)

OTHER PUBLICATIONS

FR 2 890 575 A1_English (Year: 2006).*
(Continued)

*Primary Examiner* — Youngsul Jeong
(74) *Attorney, Agent, or Firm* — Elwood L. Haynes

(57) ABSTRACT

In a process for separating carbon dioxide from a waste gas (3) of a fluid bed catalytic cracking installation (1) containing carbon dioxide, nitrogen and possibly carbon monoxide, the waste gas (3) is separated by adsorption to form a gas enriched in carbon dioxide and depleted in nitrogen (29) and a gas rich in nitrogen and depleted in carbon dioxide (31), and at least a portion of the gas enriched in carbon dioxide and depleted in nitrogen is separated in a separation device (30) by way of separation at a temperature of less than 0° C. by partial condensation and/or by distillation to form a fluid rich in carbon dioxide (35) and a fluid depleted in carbon dioxide (37).

13 Claims, 1 Drawing Sheet

(51) Int. Cl.
  *C01B 32/50*  (2017.01)
  *C10G 11/18*  (2006.01)
  *B01D 53/047*  (2006.01)

(52) U.S. Cl.
  CPC .......... *C10G 11/18* (2013.01); *B01D 2256/10* (2013.01); *B01D 2257/504* (2013.01); *C10G 2300/4043* (2013.01)

(56) References Cited

FOREIGN PATENT DOCUMENTS

| | | | | |
|---|---|---|---|---|
| FR | 2 884 304 | | 10/2006 | |
| FR | 2 884 307 | | 10/2006 | |
| FR | 2 890 575 | | 3/2007 | |
| FR | 2890575 A1 | * | 3/2007 | ......... B01D 53/0476 |

OTHER PUBLICATIONS

De Mell, L.F., $CO_2$ capture project phase 3—oxyfuel large scale pilot and demonstration projects, $2^{nd}$ Oxyfuel Combustion Conference, Sep. 12-16, 2011, Yeppoon, Queensland, Australia, 20 pages.
French Search Report for corresponding FR 1914847, dated Sep. 11, 2020.

* cited by examiner

PROCESS AND APPARATUS FOR SEPARATING CARBON DIOXIDE FROM A WASTE GAS OF A FLUID BED CATALYTIC CRACKING (FCC) INSTALLATION

CROSS REFERENCE TO RELATED APPLICATIONS

This application claims the benefit of priority under 35 U.S.C. § 119 (a) and (b) to French Patent Application No. 1914847, filed Dec. 19, 2019, the entire contents of which are incorporated herein by reference.

BACKGROUND

The present invention relates to a process and an apparatus for separating carbon dioxide from a waste gas of a fluid bed catalytic cracking installation.

The percentages indicating purities in this document are molar percentages, unless otherwise indicated.

One of the main sources of CO2 emissions in petroleum refining is fluid bed catalytic cracking, often denoted by the acronym FCC. Cracking produces between 20% and 50% of the refinery emissions and the waste gas it produces contains between 10% and 20% carbon dioxide and possibly contains carbon monoxide.

Fluid bed catalytic cracking is a refining process which has the aim of transforming, in the presence of a catalyst, the long-chain hydrocarbon heavy fractions into light fractions in order to be used in the production of fuel.

In the presence of the catalyst, at high temperature (450 to 550° C.) and at almost atmospheric pressure, large hydrocarbon molecules are broken in order to obtain small molecules having a high octane number.

The industrial process, known since 1928, is based on the use of a fluidized catalyst bed which circulates between a reactor and a regenerator. The feedstock (typically originating from distillation and vacuum distillation units of the refinery) is injected with the catalyst entering the reactor in a pipeline (also called "riser") in which the cracking reaction takes place. The products of the catalytic cracking reaction exiting the pipeline are separated from the catalyst by means of mechanical separators (typically cyclones) and then are sent into the fractionating tower. During the cracking reaction, coke forms on the surface of the catalyst which flows continuously between the reactor and the regenerator where this coke will be at least partially oxidized, mainly into CO and CO2, by injection of (possibly oxygen-enriched) air. The catalyst may thus be totally or partially (meaning that the coke is not completely removed) regenerated and then returns to the reactor.

A waste gas, called flue gas, containing carbon dioxide and nitrogen and possibly carbon monoxide, for example between 10% and 20% CO2 and between 0% and 10% carbon monoxide, typically 12.5% CO2, 7.5% CO, 80% N2, all percentages in this document being molar percentages (on a dry basis), is produced in the regenerator.

It is separated again from the catalyst and dust by mechanical gas/solid separators (generally cyclones) in the regenerator and then possibly in an electrostatic precipitator. The conditions of this waste gas at the outlet from the regenerator are typically a temperature of between 500 and 850° C. and a pressure between atmospheric pressure and 5 barg. The examples in this document shall consider as assumptions a temperature of 715° C. and a pressure of 2.4 barg. The waste gas is then expanded (in a turbine or else in a valve) to atmospheric pressure and then, if it contains CO, is treated to convert the carbon monoxide into carbon dioxide in a converter referred to as a "CO boiler". This converter produces heat which is used to produce steam or to heat another fluid (for example hot oil).

In the case of CO2 capture, the prior art then proceeds to treat this waste gas enriched in carbon dioxide by amine scrubbing to remove the carbon dioxide it contains. This scrubbing consumes a great deal of steam which is not necessarily available in excess on site and the production of which consumes fossil fuels.

It is known from U.S. Pat. No. 4,542,114 to modify an FCC to feed the regenerator with an oxidizing gas consisting of a mixture of carbon dioxide (possibly recycled) and between 24% and 30% oxygen instead of air. The gas reacts with the coke to release heat and regenerate the catalyst. The waste gas formed in the regenerator contains 83% carbon dioxide, 9% water, 7% carbon monoxide, 0.5% oxygen, 0.5% sulfur oxides and 500 ppm NOx. The carbon monoxide is oxidized to carbon dioxide in the presence of oxygen. The hot combustion gases are cooled while generating steam. They may then be purified (to remove impurities such as SOx, NOx, and also the oxygen excess and other air gases (N2, Ar)) and possibly compressed and dried (or even liquefied, depending on their final use. It is known to use an FCC in oxycombustion mode. A portion of the waste gas produced is recycled to the combustion. In this case, the waste gas produced by the regenerator generally comprises between 80 and 98 vol. % carbon dioxide (dry basis).

The FCC processes using oxycombustion in the regenerator entail significant modifications to the core of the process, to the way in which the subtle equilibria of this unit (flow rate of circulating catalyst, heat transfer, residual coke on the catalyst) are regulated in stable operation, and to the way in which the operation of the unit is started/stabilized. This is the reason why FCC operators are currently reluctant concerning this technology which is not yet established on the industrial scale.

In order to overcome these difficulties, the present invention proposes not significantly modifying the core of the FCC process (=the reactor and the regenerator), but rather treating the waste gas of the regenerator in an innovative manner to produce an FCC waste gas which is "concentrated" but contains less than 80% carbon dioxide, preferentially between 60% and 70% CO2, indeed even slightly less than 50% carbon dioxide. This concentration can be affected by enriching the waste gas in CO2 in an adsorption unit after having possibly converted the carbon monoxide still present in the waste gas into CO2.

SUMMARY

According to one subject of the invention, a process is provided for separating carbon dioxide from a waste gas of a fluid catalytic cracking installation containing carbon dioxide, nitrogen and possibly carbon monoxide, wherein:

i) if appropriate, at least a portion of the carbon monoxide of the waste gas is converted into carbon dioxide to form a flow enriched in carbon dioxide, ii) the waste gas, or, where applicable, the flow enriched in carbon dioxide from step i), is separated by adsorption to form a gas enriched in carbon dioxide and depleted in nitrogen and a gas rich in nitrogen and depleted in carbon dioxide, and iii) at least a portion of the gas enriched in carbon dioxide and depleted in nitrogen is separated in a separation device by way of separation at a temperature of less than 0° C. by partial condensation and/or by distillation to form a fluid rich in carbon dioxide and a fluid depleted in carbon dioxide.

According to other optional characteristics:

the waste gas is filtered upstream of step i) to remove dust and/or catalyst particles.

the flow enriched in carbon dioxide is compressed upstream of step ii) to a pressure of between 2.5 and 10 bar abs.

the gas rich in nitrogen and depleted in carbon dioxide contains less than 5 mol % $CO_2$, indeed even less than 3% $CO_2$, or even less than 1.5% $CO_2$.

the gas enriched in carbon dioxide contains more than 45 mol % $CO_2$, indeed even more than 50% $CO_2$, or even more than 70% $CO_2$, or indeed more than 80% $CO_2$.

the fluid depleted in carbon dioxide contains at most 15% $CO_2$.

the fluid depleted in carbon dioxide is compressed and mixed with the flow enriched in carbon dioxide sent to step ii).

the gas rich in nitrogen and depleted in carbon dioxide is expanded in a turbine and is sent to atmosphere, possibly after heating.

the gas rich in nitrogen and depleted in carbon dioxide is heated by a fluid originating from the catalytic cracking installation or by at least a portion of the gas enriched in carbon dioxide and depleted in nitrogen or by at least a portion of the waste gas, or at least a portion of the flow enriched in carbon dioxide.

the waste gas is expanded upstream of step i) in a turbine and the flow enriched in carbon dioxide is compressed in a compressor driven by the turbine upstream of step ii).

an electricity generator and/or a motor is mounted on the same shaft or the same speed-increasing gearing as the compressor for the flow enriched in carbon dioxide upstream of step ii) and the turbine for the waste gas.

the fluid depleted in carbon dioxide is separated in a membrane to produce a permeate enriched in $CO_2$, and the permeate is sent upstream of step ii).

the non-permeate is expanded in a turbine and/or mixed with the gas rich in nitrogen and depleted in carbon dioxide and/or.

the membrane separates the fluid at a temperature of less than −30° C.

the fluid depleted in carbon dioxide and/or the gas rich in nitrogen and depleted in carbon dioxide is expanded in a turbine to a temperature of less than 0° C. and greater than −100° C. in a chamber containing the separation device.

a portion of the fluid rich in carbon dioxide is sent to the adsorption unit as a rinsing gas.

at least a portion of the carbon monoxide of the waste gas is converted into carbon dioxide to form a flow enriched in carbon dioxide by combustion of the carbon monoxide in air and in the presence of a fuel.

at least a portion of the carbon monoxide of the waste gas is converted into carbon dioxide to form a flow enriched in carbon dioxide by combustion of the carbon monoxide in oxygen and in the presence of a gas containing at least 90% oxygen.

at least a portion of the gas rich in nitrogen and depleted in carbon dioxide and/or at least a portion of the fluid rich in carbon dioxide and/or at least a portion of the fluid depleted in carbon dioxide is/are sent to the combustion of the carbon monoxide.

the waste gas exiting the regenerator contains less than 70% carbon dioxide, preferably less than 50% carbon dioxide.

the waste gas exiting the regenerator contains more than 50% nitrogen, preferably more than 70% nitrogen.

no part of the gas enriched in carbon dioxide and depleted in nitrogen is sent to the catalytic cracking installation.

no part of the fluid rich in carbon dioxide is sent to the catalytic cracking installation.

the fluid rich in carbon dioxide serves as product.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
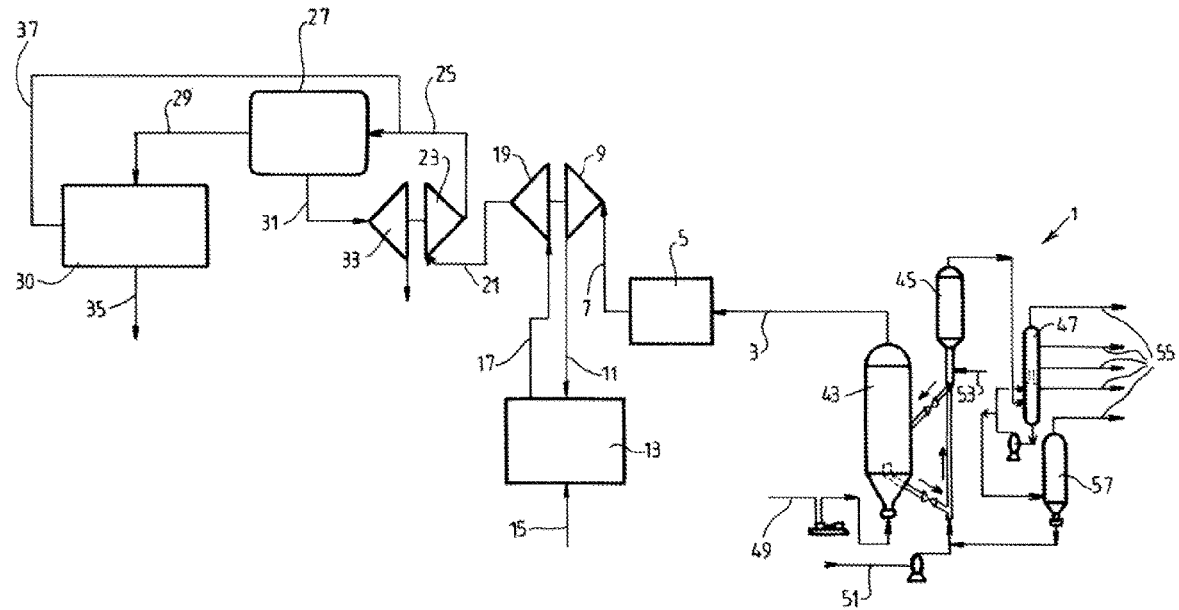
FIG. 1 is a schematic representation of a process according to one embodiment of the invention.

In FIG. 1, the unit 1 is a fluid catalytic cracking unit of a refinery. It comprises a reactor 45 and a regenerator 43. In this process, the catalyst flows continuously between the reactor 45 and the regenerator 43 into which combustion air 49 is blown, and then returns to the reactor 45 after having been freed of the coke which has accumulated on the catalyst during the reaction. The reactor 45 is fed with steam 53.

The air 49 may possibly be enriched in oxygen so as to contain at most 30% oxygen, without significantly modifying the structure of the unit 1 and the processes performed in the unit 1.

After passage of the feedstocks 51 into the reactor 45, the effluents are guided to the main fractionating tower 47 in order to form the products 55 of the FCC. The bottom liquid of the tower 47 is sent to a particulate separator 57. The functioning of the unit 1 is well known in the art.

The waste gas 3 extracted from the regenerator 43 contains carbon monoxide, carbon dioxide and nitrogen, and also dust. After separation of the dust in the filter 5, a purified gas 7 is produced containing for example 80% nitrogen, 12.5% carbon dioxide and 7.5% carbon monoxide. This gas 7 is at 3.5 bar and 650° C. and is expanded in a turbine 9 or in a valve to a pressure close to atmospheric pressure and a temperature of approximately 450° C. This expanded gas 11 is sent to a conversion unit 13 referred to as a "CO boiler", where the carbon monoxide in the gas 11 is converted into carbon dioxide, at least partially by combustion with air 15. The conversion process also produces steam.

In certain operating modes of the unit 1, it is possible to produce a waste gas containing very little carbon monoxide. In this case, the step of conversion in unit 13 is not necessary.

This produces a gas 17 at atmospheric pressure and around 120° C. containing 17% $CO_2$, 3% oxygen and 80% nitrogen. The gas 17 is possibly filtered and then compressed in a compressor 19 coupled to the turbine 9 to produce a compressed gas 21.

An electricity generator and/or a motor may also be provided on the same shaft as the compressor 19 and the turbine 9. The stages of compression and expansion may be mounted on an integrated speed-increasing gearing ("integrally geared" centrifugal device).

The compressed gas 21 is then compressed in a compressor 23 to between 2.5 and 10 bar, for example at least 8 bar and at least 30° C. as gas 25. The gas 25 feeds a unit for separation by pressure swing adsorption 27, generally known under the acronym PSA. There, it is separated to form a gas enriched in carbon dioxide and depleted in nitrogen and oxygen 29 (constituting a tail gas) and a gas rich in nitrogen, enriched in oxygen and depleted in carbon dioxide 31 (constituting the product gas). The gas 31 at approximately 8 bar is expanded (possibly after preheating) in a turbine 33 coupled to the compressor 23 and is released to the atmosphere with a composition of 97% nitrogen and 3% carbon dioxide. The gas 31 comprises at most 5% carbon dioxide, or at most 3% carbon dioxide, indeed even at most 1.5% carbon dioxide.

This expansion in the turbine 33 can be done after heating the gas 31. It may be heated with a hot fluid from the catalytic cracking installation 1 and/or by exchange with a fluid exiting a compression stage upstream of the adsorption unit 27 or upstream of the unit 30. It may even be possible to have two turbine stages in series with intermediate heating in order to maximize the recovery of energy at the shaft of the turbine.

The unit 27 may be a unit for separation by vacuum pressure swing adsorption, generally known under the acronym VPSA. In this case, the gas 21 is compressed less, but the unit comprises vacuum pumps. The purity of the gas 29 will be higher in CO2 and the electrical consumption of the unit 27 may be lower.

The gas 29 containing between 50% and 60% carbon dioxide and between 40% and 50% nitrogen and around 1% oxygen is compressed to a pressure of greater than 15 bar abs and preferentially between 20 and 30 bar abs (the compressor is included in the unit 30), dried and then cooled in a separation apparatus 30 to a temperature of less than 0° C. by partial condensation and/or by distillation to form a fluid rich in carbon dioxide 35 and a fluid depleted in carbon dioxide 37. The gas 29 may contain at least 45% CO2, or at least 50% CO2, or at least 80% CO2.

The fluid 35 contains at least 70%, and preferentially at least 95%, carbon dioxide in liquid or gaseous form. A portion of the fluid 35 may be sent to the adsorption unit 27 as a rinsing gas. At least part of the fluid 35 serves as product.

The fluid 37 contains between 15% and 25% carbon dioxide and also nitrogen and oxygen and is recycled upstream of the adsorption unit 27 to join the gas 25 as feed flow. Before being mixed with the gas 25, the fluid 37 can be expanded in a valve or a turbine.

The fluid depleted in carbon dioxide 37 is optionally separated in a membrane to produce a permeate enriched in CO2. The permeate may be sent to the adsorption unit 27 as feed gas for separation. The residue can be expanded in a turbine and/or mixed with the gas rich in nitrogen and depleted in carbon dioxide 31.

The membrane may optionally separate the fluid 37 at a temperature of less than −30° C.

The fluid depleted in carbon dioxide 37 and/or the gas rich in nitrogen and depleted in carbon dioxide 31 may be expanded in a turbine to a temperature of less than 0° C. and greater than −100° C. in a chamber containing the separation device 30. It thus contributes to the production of the required frigories.

A dryer for the flow 25 may be installed upstream of the unit 27. A separation unit utilizing activated carbon may be installed on the flow 29 upstream of the unit 30 or on the flow 25 upstream of the unit 27 in order to remove impurities.

Figure 2:
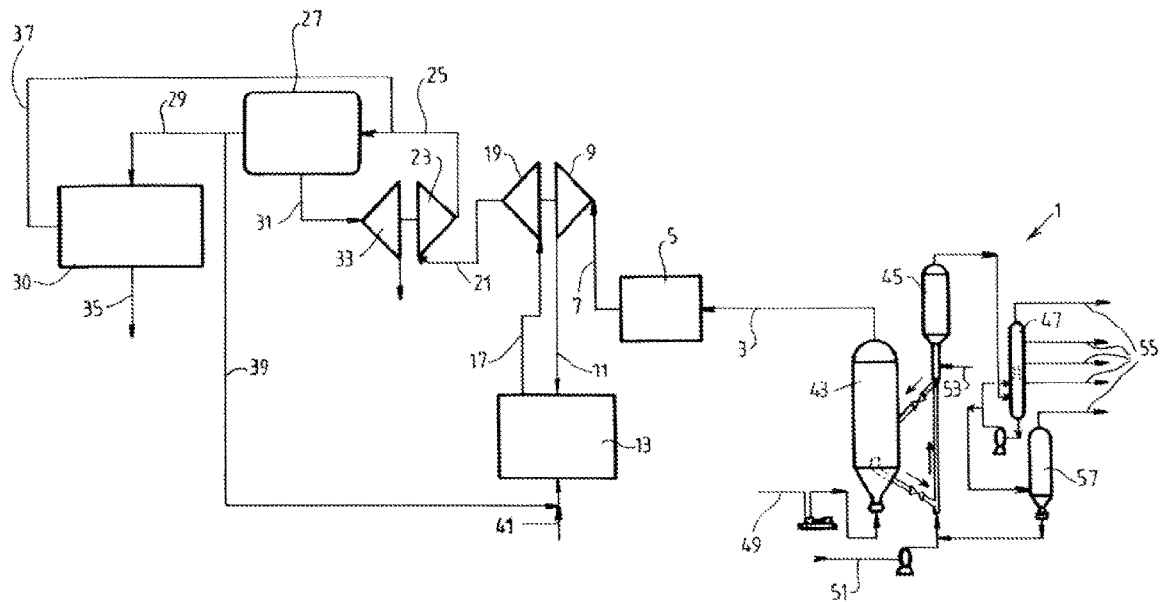
FIG. 2 is a schematic representation of a process according to one embodiment of the invention.

In FIG. 2, the main difference from FIG. 1 is that the expanded gas 11 is sent to a conversion unit 13 where the carbon monoxide in the gas 11 is converted into carbon dioxide, at least partially by combustion with oxygen 41. The oxygen 41 contains at least 90% oxygen and at most 10% nitrogen. It may contain at least 99.5% oxygen. In this way, the gas produced contains between 20% and 30% $CO_2$, for example 26% $CO_2$. The gas 29 is richer in $CO_2$ (67%) and the gas 37 is also richer in $CO_2$ (22%). A portion 39 of the gas 29 produced by the PSA 27 can be recycled to the conversion unit 13 at 1.05 bar and containing 67% $CO_2$. At least a portion of the fluid 39 is mixed with oxygen to form the oxidant used by the conversion unit 13. In addition or alternatively, a portion of the fluid 35 and/or a portion of the fluid 37 may be sent to the conversion unit 13. Thus, it is possible that no part of the fluid 35 is sent to the conversion unit 13.

The FCC 1 continues to be fed with optionally oxygen-enriched air 49 (as in FIG. 1).

In addition to producing a waste 17 which is richer in carbon dioxide, the process of FIG. 2 makes it possible to increase the temperature of the flame in the converter 13, which makes it possible to produce steam at a higher pressure and/or at a higher temperature while at the same time increasing the efficiency of the production of steam.

The unit 27 and the unit 30 of FIG. 2 will be smaller than those of FIG. 1.

What is claimed is:

1. A process for separating carbon dioxide from a waste gas of a fluid bed catalytic cracking installation containing carbon dioxide, nitrogen and carbon monoxide, wherein:
    i) at least a portion of the carbon monoxide of the waste gas is converted into carbon dioxide to form a flow enriched in carbon dioxide,
    ii) the waste gas, or the flow enriched in carbon dioxide from step i), is separated by adsorption to form a gas enriched in carbon dioxide and depleted in nitrogen and a gas rich in nitrogen and depleted in carbon dioxide,
    the process comprising:
    separating at least a portion of the gas enriched in carbon dioxide and depleted in nitrogen in a separation device by separation at a temperature of less than 0° C. by partial condensation and/or by distillation to form a fluid rich in carbon dioxide and a fluid depleted in carbon dioxide,
    wherein a portion of the fluid rich in carbon dioxide is sent to step ii) as a rinsing gas.

2. The process according to claim 1, wherein the waste gas or the flow enriched in carbon dioxide is compressed upstream of step ii) to a pressure of between 2.5 and 10 bar abs.

3. The process according to claim 1, wherein the gas rich in nitrogen and depleted in carbon dioxide contains less than 5 mol % $CO_2$.

4. The process according to claim 1, wherein the gas enriched in carbon dioxide and depleted in nitrogen contains more than 45 mol % $CO_2$.

5. The process according to claim 1, wherein the fluid depleted in carbon dioxide contains at most 15% $CO_2$.

6. The process according to claim 1, wherein the fluid depleted in carbon dioxide is compressed and mixed with the flow enriched in carbon dioxide sent to step ii).

7. The process according to claim 1, wherein the gas rich in nitrogen and depleted in carbon dioxide is expanded in a turbine and is sent to the atmosphere.

8. The process according to claim 7, wherein the gas rich in nitrogen and depleted in carbon dioxide is heated by a fluid originating from the fluid bed catalytic cracking installation or by at least a portion of the gas enriched in carbon dioxide and depleted in nitrogen or by at least a portion of the waste gas, or by at least a portion of the flow enriched in carbon dioxide.

9. The process according to claim 1, wherein the waste gas is expanded upstream of step i) in a turbine and the flow enriched in carbon dioxide is compressed in a compressor driven by the turbine upstream of step ii).

10. The process according to claim 9, wherein an electricity generator and/or a motor is mounted on the same shaft or the same speed-increasing gearing as the compressor for the flow enriched in carbon dioxide upstream of step ii) and the turbine for the waste gas.

11. The process according to claim 1, wherein the fluid depleted in carbon dioxide and/or the gas rich in nitrogen and depleted in carbon dioxide is expanded in a turbine to a temperature of less than 0° C. and greater than −100° C. in a chamber containing the separation device.

12. The process according to claim 1, wherein at least a portion of the carbon monoxide of the waste gas is converted into carbon dioxide to form a flow enriched in carbon dioxide by combustion of the carbon monoxide in air and in the presence of a fuel.

13. The process according to claim 1, wherein no part of the gas enriched in carbon dioxide and depleted in nitrogen and/or of the fluid rich in carbon dioxide is sent to the fluid bed catalytic cracking installation.

* * * * *